March 13, 1928.                                                         1,662,107
L. EMANUELI
HIGH TENSION ELECTRIC CABLE
Filed Sept. 1, 1925
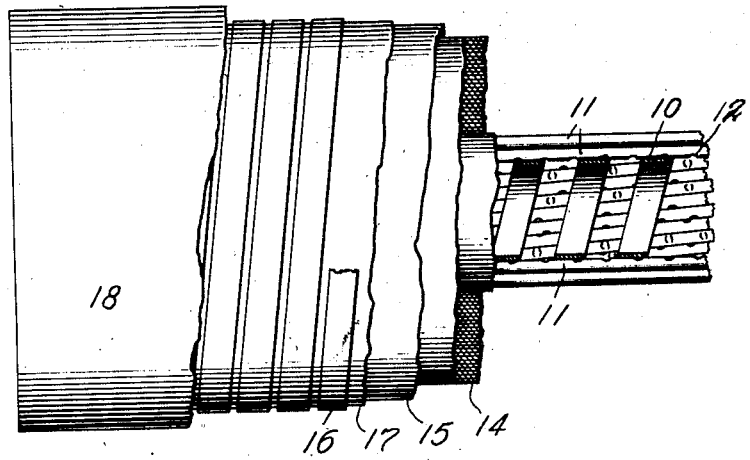
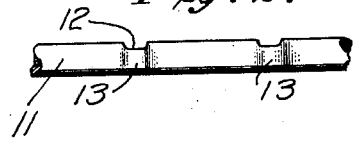
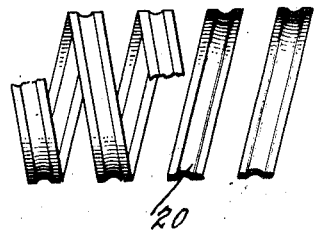
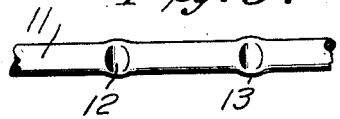
Inventor:
Luigi Emanueli,
by Emil Bonnelycke
His Attorney Patented Mar. 13, 1928.

1,662,107

UNITED STATES PATENT OFFICE.

LUIGI EMANUELI, OF MILAN, ITALY, ASSIGNOR TO SOCIETA ITALIANA PIRELLI, OF MILAN, ITALY, A CORPORATION OF ITALY.

HIGH-TENSION ELECTRIC CABLE.

Application filed September 1, 1925. Serial No. 53,928.

The present invention relates to high tension cables of the type in which the strands of the conductor are supported by a hollow metallic core and through which oil flows and impregnates the insulation that surrounds the conductor.

My invention has for its object to improve the construction of cable of the above-mentioned type. For a consideration of what I believe to be novel and my invention, attention is directed to the accompanying description and the claims appended thereto.

In the accompanying drawing which illustrates one of the embodiments of my invention, Fig. 1 is a view partly in elevation and partly in section of a high tension cable; Figs. 2 and 3 are respectively side elevation and plan views of one of the strands or wires; Fig. 4 is a sectional view of a modified form of core, and Fig. 5 is a diagrammatic view of a cable installation.

In a cable of the character herein referred to, it is of the utmost importance to keep it filled with oil at all times and to keep out air and moisture. The temperature of such a cable varies due to the heating effect of the current passing through it, and also to changes in climatic conditions. As the cable heats the oil is expanded and flows from the passage in the cable core into one or more external and sealed reservoirs provided for the purpose. As the cable cools the oil flows back from the reservoir into the cable at a speed determined by the rate of cooling of the cable. It will be appreciated that if the friction between the oil and the wall of the passage in the cable is excessive a vacuum may result at one or more points in the cable which decreases the effectiveness of the dielectric and may ultimately cause a burn-out.

As heretofore constructed, the copper wires or strands forming the conductor are laid or stranded around a core and afterwards covered with insulation. The core is composed of wire of circular cross section coiled into a helix after the fashion of a coiled extension spring and the oil flows through the central passage thus formed. The turns of the core extending as they do almost perpendicular to the axis of the passage offer a very substantial resistance to the flow of oil to and from the cable. This is due to the fact that the wire being of round section with spaces between causes eddy currents or whirls which oppose the flow of oil in the central passage.

I have discovered an arrangement of parts whereby the above-mentioned objection is overcome and at the same time a better cable produced. For the round section wire heretofore used in the core I substitute a metal ribbon 10 and wind it flatwise to form an open helix. With a core constructed in this manner the passageway for the oil may be made substantially larger in cross section for the same outside diameter of cable, or if the passageway be kept of the same size as heretofore, then the outside diameter of the cable made smaller, which means a substantial reduction in cost. Furthermore, the frictional resistance to the flow of oil is very greatly reduced due to the practical elimination of whirls and eddies between adjacent turns of the helix. I ascribe the freedom from whirls, etc. to the fact that the ribbon is thin and the turns rather widely spaced so that considered as a whole the wall of the central passage is much smoother than with the old construction.

Wound or stranded on the core are strands of bare wire 11 which carry the electric current and which are arranged in layers, there being two such layers in the present case. These strands are wound around the core to form a long pitch spiral, the strands of one layer crossing those of the other at an angle. The strands are tightly wound in layers about the core and in contact with one another and have to be so wound for mechanical reasons. This has one objection, namely, that it prevents the oil from freely flowing from the central passage in the core into and through the dielectric. I overcome this by slightly deforming the copper wires or strands 11 so that a large number of small passages will be formed between adjacent wires of the same layer. This may simply and cheaply be done by passing the wire between rollers, one of which has projections that indent the wire as at 12 in Figs. 2 and 3. As the wire is round to start with, when pressure is applied at a series of points the metal spreads under the pressure points with the result that the periphery of the wire instead of being smooth has small bumps 13 and depressions 12 and hence when the wires are laid side by side there will be small openings between them through which oil can easily flow.

Tightly wound around the conductor is a body of paper 14 having suitable insulating properties and which is impregnated with oil from the central passage in the core. Surrounding the paper is a lead sheath 15 which being sealed at every point prevents the escape of oil.

Under some conditions, due to the profile of the area over which the cable is laid, the oil within it is under considerable pressure. This sometimes causes the lead sheath to bulge at one or more points and if the pressure continues may even cause a rupture. Such a bulge is in any event a potential danger spot for failure of the insulation is almost certain to occur. To prevent this the lead sheath is spirally wrapped with a thin tape 16 made of copper or other suitable metal. This tape or ribbon may be wound as a single strip or a plurality of strips may be wound simultaneously. To prevent the tape and particularly the edges thereof from cutting into the lead sheath a few layers of hard paper 17 are interposed between the two.

Surrounding the cable thus formed is a lead covering 18 which is in a metallic and electrical contact with the binding metal tape 16. As before stated the lead sheath is made continuous so as to prevent the escape of oil and it is grounded by a suitable connection to earth, as at 19. The casing, 18, however, is made discontinuous and is not grounded by any special means, the purpose being to prevent as far as possible the formation of local eddy currents which cause disintegration of the casing.

In Fig. 4 is shown a slightly modified form of core. In this case the ribbon 10 instead of being perfectly flat has an arched central portion 20, the purpose being to give the core additional strength and to prevent crushing either in the manufacture of a cable or in installing it. It is preferable to locate the arch in the center of the ribbon because a symmetrical arrangement affords an easier and smoother path for the oil. It is also the best arrangement from a mechanical and manfacturing point of view. By locating the arch centrally and extending it inwardly two points of support are provided for each strand thus preventing a turn or part of a turn of the core from tilting or twisting, as it might otherwise do when subjected to heavy external pressure. A core having such an arch is particularly useful where the external pressures exerted thereon as in bending, are heavy. The fact that the arches are small and are connected to the sides by smooth, easy curves, means that the frictional opposition to flow of oil will not be substantially greater in this case than in the one previously described.

In Fig. 5 is diagrammatically shown a length of cable in which 21 indicates a reservoir for feeding oil to the passage in the center of the cable, 15 the lead sheath which is grounded at its ends and 18 the discontinuous lead casing.

What I claim as new and desire to secure by Letters Patent of the United States is:—

1. In a high tension electric cable, the combination of a metallic core through which oil flows, said core forming a helix, current conductors stranded on and supported by the helix, means for forming channels between certain of the conductors so as to permit oil from within the core to flow outwardly, dielectric material which surrounds the conductors and is impregnated with the oil, and an enclosing metal sheath.

2. In a high tension electric cable, the combination of a core through which oil flows, said core comprising a thin metal ribbon wound flatwise to form a helix having a central passage, conductors stranded on and supported by the core, certain of which have projections that form oil channels between conductors to permit oil from within the core to flow outwardly, dielectric material which surrounds the conductors and binds them in place, and an enclosing metal sheath.

3. In a high tension electric cable, the combination of a core through which oil flows under pressure and which comprises a thin metal ribbon wound flatwise to form an open helix, conductors arranged in layers and stranded on the core, means forming oil passages between conductors, tightly wound dielectric material which surrounds the conductors, assists in holding them in place and which is impregnated with oil, a lead sheath for the dielectric, a metal tape which is wound around the sheath to prevent enlargement thereof due to increase of oil pressure, and a lead covering for the tape, In witness whereof, I have hereunto set my hand this 24th day of August, 1925.

LUIGI EMANUELI.